(12) United States Patent
Sandhaus et al.

(10) Patent No.: US 12,531,805 B2
(45) Date of Patent: Jan. 20, 2026

(54) SYSTEMS AND METHODS OF PACKET CLASSIFICATION USING ARTIFICIAL INTELLIGENCE

(71) Applicant: MELLANOX TECHNOLOGIES, LTD., Yokneam (IL)

(72) Inventors: Ran Sandhaus, Tel Aviv (IL); Gil Levy, Hod Hasharon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 359 days.

(21) Appl. No.: 17/746,460

(22) Filed: May 17, 2022

(65) Prior Publication Data

US 2023/0379249 A1    Nov. 23, 2023

(51) Int. Cl.
*H04L 45/745* (2022.01)
*H04L 9/40* (2022.01)
*H04L 69/22* (2022.01)

(52) U.S. Cl.
CPC ........ *H04L 45/745* (2013.01); *H04L 63/1425* (2013.01); *H04L 69/22* (2013.01)

(58) Field of Classification Search
CPC .............................. H04L 45/745; H04L 69/22
See application file for complete search history.

(56) References Cited

U.S. PATENT DOCUMENTS

| | | | | |
|---|---|---|---|---|
| 12,088,655 | B1* | 9/2024 | Thoma | H04L 43/0852 |
| 2019/0158414 | A1* | 5/2019 | Navon | H04L 47/2441 |
| 2019/0260683 | A1* | 8/2019 | Hughes | H04L 47/00 |
| 2019/0387042 | A1* | 12/2019 | Prajapat | G06N 20/00 |
| 2021/0216908 | A1* | 7/2021 | Lu | G06N 5/01 |
| 2021/0306359 | A1* | 9/2021 | Gupta | H04L 41/344 |
| 2021/0314297 | A1* | 10/2021 | Peterson | H04L 63/0263 |
| 2022/0366494 | A1* | 11/2022 | Cella | H04L 9/50 |
| 2023/0126783 | A1* | 4/2023 | Hu | G06F 16/9014 |
| | | | | 711/216 |
| 2023/0169370 | A1* | 6/2023 | Elmasry | G06N 3/045 |
| | | | | 706/45 |
| 2023/0319101 | A1* | 10/2023 | Lai | H04L 63/1458 |
| | | | | 726/23 |
| 2025/0274611 | A1* | 8/2025 | Kondrad | H04N 19/42 |

FOREIGN PATENT DOCUMENTS

CA    3183228 A1 * 12/2021    ........... G06F 40/131

OTHER PUBLICATIONS

Swamy et al. "Taurus: A Data Plane Architecture for Per-Packet ML," arXiv:, Feb. 12, 2020, arXiv:202.08987, 16 pages.
Xiong et al. "Do Switches Dream of Machine Learning? Toward In-Network Classification," HotNets '19, Nov. 13-15, 2019, 9 pages.

* cited by examiner

*Primary Examiner* — Melanie Jagannathan
(74) *Attorney, Agent, or Firm* — Sheridan Ross P.C.

(57) ABSTRACT

A network device, system-on-a-chip, and method of performing packet handling are described. A packet is received, and a lookup based on one or more packet header fields of the packet is performed using a lookup generator action handler. An artificial intelligence engine processes packet header data associated with the packet, and a smart indication is generated. A forwarding decision is made for the packet based on the lookup performed by the lookup generator action handler as well as based on the smart indication generated with the artificial intelligence engine.

20 Claims, 5 Drawing Sheets

SYSTEMS AND METHODS OF PACKET CLASSIFICATION USING ARTIFICIAL INTELLIGENCE

FIELD OF THE DISCLOSURE

The present disclosure is generally directed to communication systems, and more particularly to a system for classifying packets transmitted through a switch.

BACKGROUND

Conventional systems for forwarding packets are insufficient in a number of ways. For example, proper packet forwarding often requires data which is not directly apparent based on information in a packet's header. Forwarding logic may be affected based on a particular task and based on data patterns. Conventional systems and methods incur excessive costs in latency, bandwidth, table area, etc.

SUMMARY

In an embodiment disclosed herein, a device, such as a switch, a network interface controller (NIC), or other computer system capable of receiving and transmitting data, is enabled to receive a packet, process information from the packet using an artificial intelligence (AI) and/or machine learning (ML) engine, generate a smart indication, and to transmit the packet based, at least in part, on the smart indication. A device, as described herein, may be enabled to forward a received packet to a proper destination or to drop the packet if the packet is determined to be malicious.

Systems and methods as described herein offer a number of advantages over conventional approaches. For example, disclosed systems and methods offer efficient packet handling at high speeds with low latency and a high bandwidth; systems and methods described herein do not require multiple lookups, resulting in a higher bandwidth as compared to conventional systems; disclosed systems and methods offer efficient table areas as compared to conventional systems as systems as disclosed herein may only need area to store model weights; disclosed systems and methods can be used for a variety of problems as described herein; disclosed systems and methods offer a more robust and secure networking scheme as compared to conventional systems; disclosed systems and methods offer smaller latency and bandwidth price as compared to conventional systems which generate complex indications by multiple lookups; disclosed systems and methods may replace a complex lookups series with a single efficient computation; disclosed systems and methods offer enhanced network traffic telemetry as compared to conventional systems; disclosed systems and methods offer higher-level indications which contribute to mitigation of root cause analysis procedures as compared to conventional systems; and disclosed systems and methods offer an efficient abstraction layer combined with a classical forwarding control pipeline as compared to conventional systems.

Additional features and advantages are described herein and will be apparent from the following description and the figures.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably, and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Datacenters are the storage and data processing hubs of the Internet. The deployment of cloud applications is causing datacenters to expand exponentially in size, stimulating the development of faster switches than can cope with the increasing data traffic inside the datacenter. Current state-of-the-art switches are capable of handling over 25 Tb/s of traffic by employing electrical switches in the form of application specific integrated circuits (ASICs) equipped with 256 data lanes, each operating at 100 Gb/s. Such switching ASICs typically consume as much as 400 Watts, and the power consumption of the optical transceiver interfaces attached to each ASIC is comparable. To keep pace with traffic demand, switch capacity doubles approximately every two years. To date, rapid switch scaling has been made possible by exploiting advances in manufacturing (e.g., CMOS techniques), collectively described by Moore's law (i.e., the observation that the number of transistors in a dense integrated circuit doubles about every two years). However, in recent years there are strong indications of Moore's law slowing down, which raises concerns about the capability to sustain the target scaling rate of switch capacity. As a result, alternative technologies are being investigated.

Optical switches are one solution for enabling advances in networking due to the technology's potential for extremely high data capacity and low power consumption. Optical switches feature optical input and output ports and are capable of routing light that is coupled to the input ports to the intended output ports on demand, according to one or more control signals (electrical or optical control signals). Routing of the signals can be performed in the optical domain, i.e., without the need for optical-electrical and electrical-optical conversion, thus bypassing the need for power-consuming transceivers. Header processing and buffering of the data is not straight-forward in the optical domain and thus, packet switching (as it is realized in electrical switches) is not normally employed. Instead, the circuit switching paradigm is used: an end-to-end circuit is created for the communication between two endpoints connected on the input and the output of the optical switch.

Referring now to FIGS. 1-5, various systems and methods for parsing data packets will be described. While various embodiments will be described in connection with utilizing AI and similar techniques, it should be appreciated that embodiments of the present disclosure are not limited to the use of AI or other artificial intelligence/machine learning techniques, which may or may not include the use of one or more neural networks. As used herein, AI may refer to any of artificial intelligence, machine learning, neural network, or a combination thereof. AI as described herein may be implemented in hardware or software. For example, AI may comprise one or more of CPUs, GPUs, DPUs, FPGAs, ASICs, etc., which may perform the AI functions described herein. The methods and systems described or claimed herein can be performed with traditional executable instruction sets that are finite and operate on a fixed set of inputs to provide one or more defined outputs. Alternatively, or additionally, methods and systems described herein can be performed using AI, ML, neural networks, or the like. A system or components of a system as described herein are contemplated to include finite instruction sets and/or AI-based models/neural networks to perform some or all of the processes or steps described herein.

In some embodiments, AI is utilized to analyze information comprised by data packets. The data packets may be received directly from an originating computer system that generated the data packet, from a storage area that is used to temporarily store data packets originating in one or more computer systems, or from other computer systems. In some embodiments, data packets may be received in real-time, as part of a data stream transmitted directly from a data source to a computing device executing the AI system. In some embodiments, data packets may be received at some point after they were generated by a computer system.

A parser as described herein may move at network speed to keep up with a high volume of data packets. In some embodiments, preprocessing and/or post-processing may be executed on a Graphics Processing Unit (GPU) to achieve parsing without a need to communicate with host memory. It should be appreciated, however, that a Central Processing Unit (CPU), Data Processing Unit (DPU), or other type of processing architecture may also be used without departing from the scope of the present disclosure.

Figure 1:
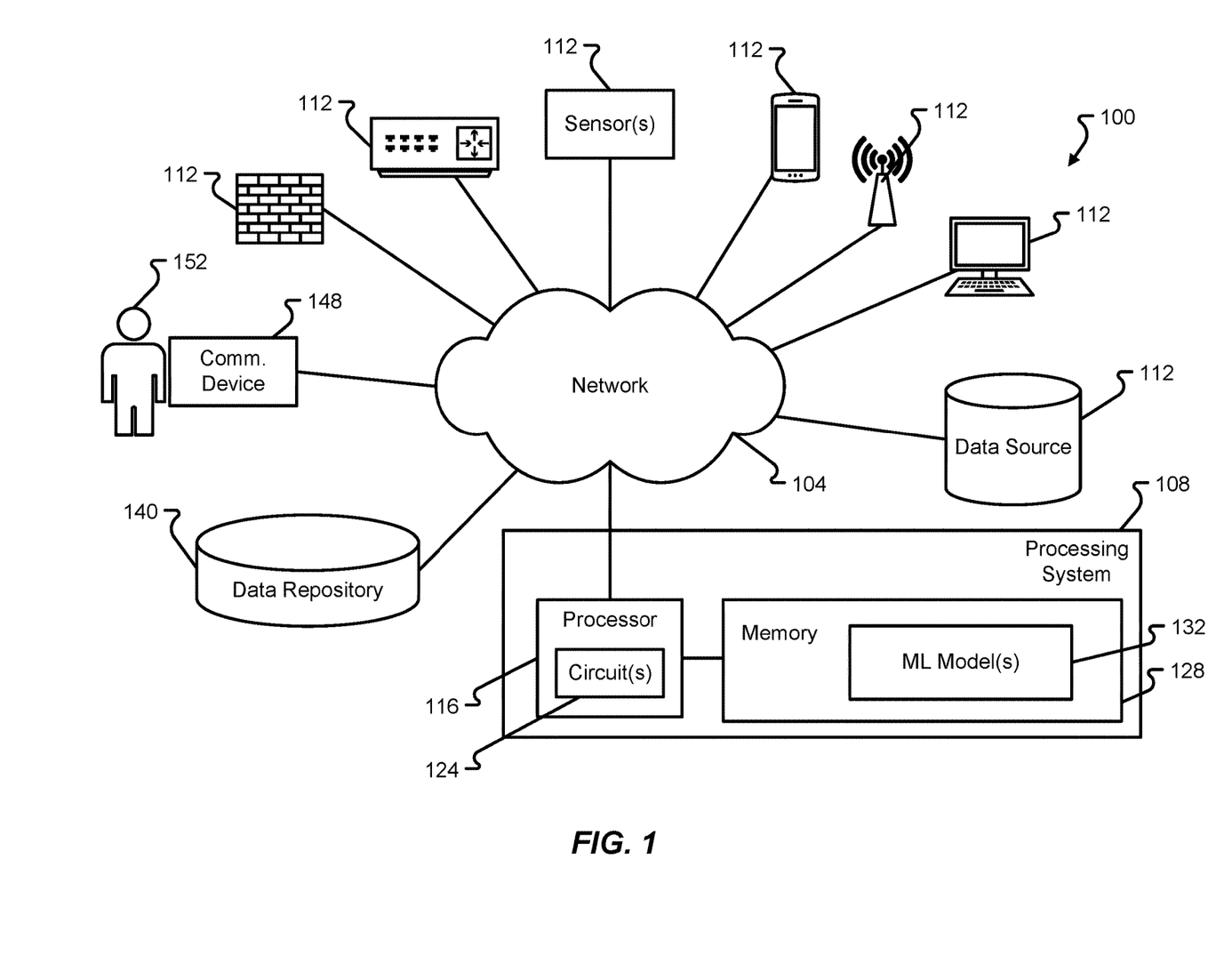
FIG. 1 is an illustration of a computing environment in accordance with one or more embodiments of the present disclosure.

Referring to FIG. 1, an illustrative computing environment 100 will be described in accordance with at least some embodiments of the present disclosure. A computing environment 100 may include a communication network 104, which is configured to facilitate machine-to-machine communications. In some embodiments, the communication network 104 may enable communications between several types of computer systems, which may also be referred to herein as data sources 112. One or more of the data sources 112 may be provided as part of a common network infrastructure, meaning that the data sources 112 may be owned and/or operated by a common entity. In such a situation, the entity that owns and/or operates the network including the data sources 112 may be interested in obtaining data packets from the various data sources 112.

Non-limiting examples of data sources 112 may include communication endpoints (e.g., user devices, Personal Computers (PCs), computing devices, communication devices, Point of Service (Pos) devices, laptops, telephones, smartphones, tablets, wearables, etc.), network devices (e.g., routers, switches, servers, network access points, etc.), network border devices (e.g., firewalls, Session Border Controllers (SBCs), Network Address Translators (NATs), etc.), security devices (access control devices, card readers, biometric readers, locks, doors, etc.), and sensors (e.g., proximity sensors, motion sensors, light sensors, noise sensors, biometric sensors, etc.). A data source 112 may alternatively or additionally include a data storage area that is used to store data packets generated by various other machines connected to the communication network 104. The data storage area may correspond to a location or type of device that is used to temporarily store data packets until a processing system 108 is ready to retrieve and process the data packets.

In some embodiments, a processing system 108 is provided to receive data packets from data sources 112 and parse the data packets for purposes of analyzing the content contained in the data packets. The processing system 108 may be executed on one or more servers that are also connected to the communication network 104. The processing system 108 may be configured to parse data packets and then evaluate/analyze the parsed data packets to determine an action to perform based on each data packet. The processing system 108 may be a switch, a NIC, or other device operable to receive and transmit data packets. The processing system 108 may be configured to determine, based on an analysis of a data packet, whether the data packet is malicious and, if the data packet is malicious, to drop the data packet instead of forwarding the data packet. The processing system 108 may be configured to determine, based on an analysis of a data packet, an address to transmit the data packet and to transmit the data packet to the determined address. The processing system 108 is depicted as a single component in the system 100 for ease of discussion and understanding. It should be appreciated that the processing system 108 and components thereof (e.g., processor 116, circuit(s) 124, and/or memory 128) may be deployed in any number of computing architectures. For instance, the processing system 108 may be deployed as a switch, a NIC, a server, a collection of servers, a collection of blades in a single server, on bare metal, on the same premises as the data sources 112, in a cloud architecture (enterprise cloud or public cloud), and/or via one or more virtual machines.

Non-limiting examples of a communication network 104 include an Internet Protocol (IP) network, an Ethernet network, an InfiniBand (IB) network, a FibreChannel network, the Internet, a cellular communication network, a wireless communication network, combinations thereof (E.g., Fibre Channel over Ethernet), variants thereof, and the like.

As mentioned above, the data sources 112 may be considered host devices, servers, network appliances, data storage devices, security devices, sensors, or combinations thereof. It should be appreciated that the data source(s) 112 may be assigned at least one network address and the format of the network address assigned thereto may depend upon the nature of the network 104.

The processing system 108 is shown to include a processor 116 and memory 128. While the processing system 108 is only shown to include one processor 116 and one memory 128, it should be appreciated that the processing system 108 may include one or many processing devices and/or one or many memory devices. The processor 116 may be configured to execute instructions stored in memory 128 which may involve utilizing one or more ML models 132 stored in memory 128. As some non-limiting examples, the memory 128 may correspond to any appropriate type of memory device or collection of memory devices configured to store instructions and/or instructions. Non-limiting examples of suitable memory devices that may be used for memory 128 include Flash memory, Random Access Memory (RAM), Read Only Memory (ROM), variants thereof, combinations thereof, or the like. In some embodiments, the memory 128 and processor 116 may be integrated into a common device (e.g., a microprocessor may include integrated memory).

In some embodiments, the processing system 108 may have the processor 116 and memory 128 configured as a GPU. The processor 116 may include one or more circuits 124 that are configured to execute an AI system using, for example, one or more ML models 132 stored in memory 128. Alternatively, or additionally, the processor 116 and memory 128 may be configured as a CPU. A GPU configuration may enable parallel operations on multiple sets of data, which may facilitate the real-time processing of one or more data packets from one or more data sources 112. If configured as a GPU, the circuits 124 may be designed with thousands of processor cores running simultaneously, where each core is focused on making efficient calculations.

Whether configured as a GPU and/or CPU, the circuits 124 of the processor 116 may be configured to execute AI in a highly efficient manner, thereby enabling real-time processing of data packets received from various data sources 112. As data packets are process/parsed by the processor 116 executing AI, outputs of the AI may be provided to a data repository 140.

The processing system 108 may also be configured to analyze the data packet(s) stored in the data repository 140 (e.g., after the data packets received directly from the data sources 112 have been processed/parsed by the AI).

As noted above, the data source(s) 112, data repository 140, and/or the processing system 108 may include storage devices and/or processing circuitry for conducting computing tasks, for example, tasks associated with controlling the flow of data internally and/or over the communication network 104. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally, or alternatively, the processing circuitry incorporated in a data source 112 and/or processing system 108 may comprise hardware, such as an application specific integrated circuit (ASIC). Other non-limiting examples of the processing circuitry include an Integrated Circuit (IC) chip, a Central Processing Unit (CPU), a Graphics Processing Unit (GPU), a microprocessor, a Field Programmable Gate Array (FPGA), a collection of logic gates or transistors, resistors, capacitors, inductors, diodes, or the like. Some or all of the processing circuitries may be provided on a Printed Circuit Board (PCB) or collection of PCBs. It should be appreciated that any appropriate type of electrical component or collection of electrical components may be suitable for inclusion in the processing circuitry.

In addition, although not explicitly shown, it should be appreciated that the data source(s) 112, data repository 140, and/or the processing system 108 may include one or more communication interfaces for facilitating wired and/or wireless communication between one another and other unillustrated elements of the environment 100.

A processing system 108 may operate as an Ethernet switch, an InfiniBand switch, or another type of networking device. A processing system 108 may comprise, as described in greater detail below, an enclosure with external pluggable modules and one or more internal printed circuit boards (PCBs).

Figure 2:
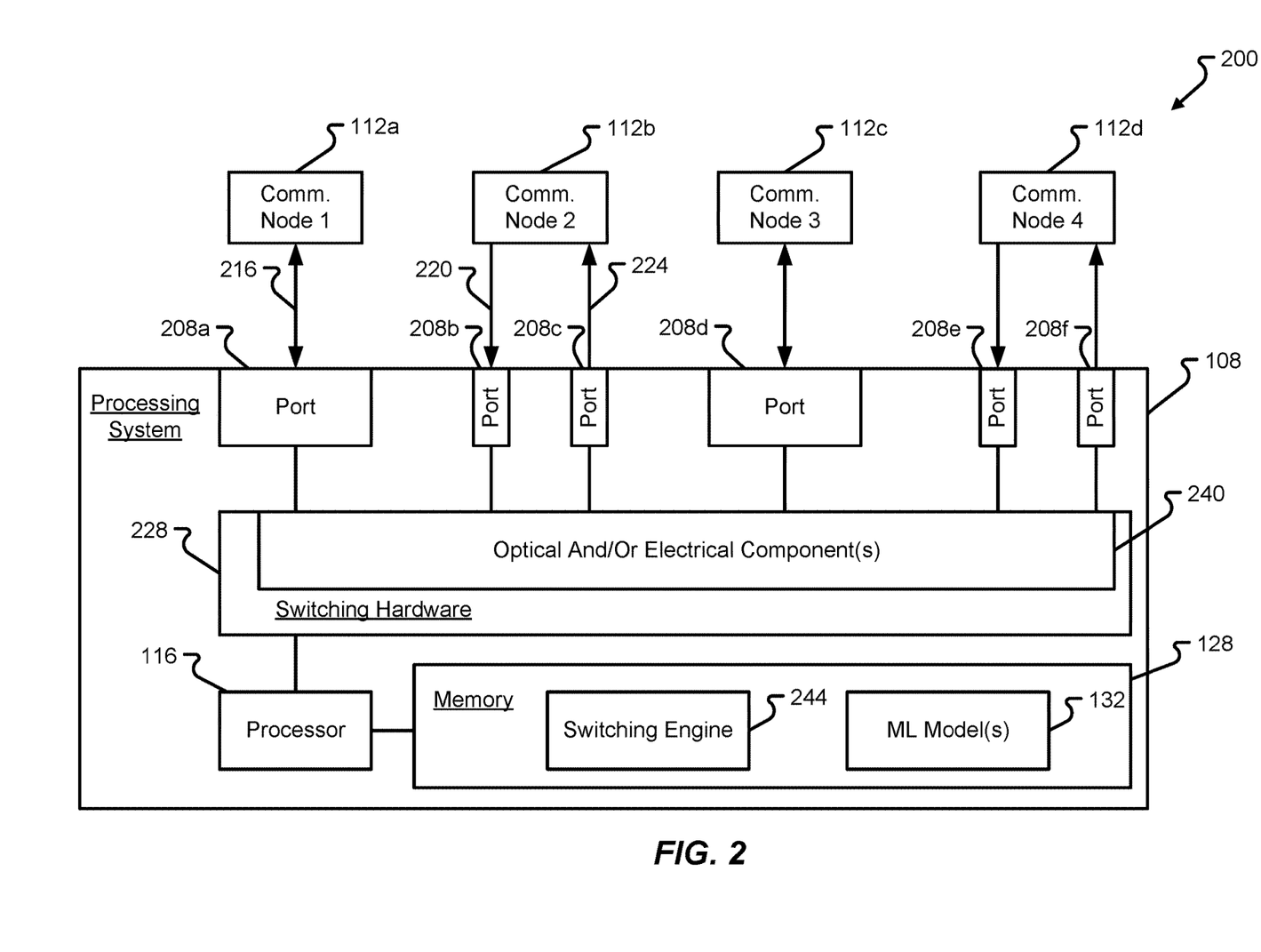
FIG. 2 is an illustration of a computing device in accordance with one or more embodiments of the present disclosure.

Referring initially to FIG. 2, a configuration of a communication system 200 will be described in accordance with at least some embodiments of the present disclosure. It should be appreciated that the components described with reference to FIG. 2 may or may not also be used in an environment 100 as shown in FIG. 1.

In the configuration of FIG. 2, a communication system 200 is shown to include a processing system 108, such as a switch, connecting one or more data sources 112 via a number of communication ports 208. The illustrated processing system 108 is shown to be connected with four data sources data source 112*a-d* via a plurality of communication ports 208. The illustration of four data sources data source 112*a-d* is for ease of discussion and should not be construed as limiting embodiments of the present disclosure. Specifically, a processing system 108 may be configured to connect any suitable number of data sources data source 112 and the processing system 108 may include a number of ports 208 to facilitate such connections. Even more specifically, a processing system 108 may be configured to connect a greater or lesser number of data sources data source 112 than are shown in FIG. 2. Moreover, embodiments of the present disclosure contemplate that not all ports 208 of a processing system 108 need to be connected with a data source 112. For instance, one or more ports 208 of a processing system 108 may be left unconnected (e.g., open) and may not have any particular networking cable 216 plugged into the port 208.

The data sources data source 112a-d may be the same type of devices or several types of devices. As a non-limiting example, some or all of the data sources 112a-d may correspond to a Top-of-Rack (TOR) switch. Alternatively, or additionally, one or more of the data sources data source 112a-d may correspond to a device other than a TOR switch. The data sources data source 112a-d do not necessarily need to communicate using the same communication protocol because the processing system 108 may include components to facilitate protocol conversion and/or a data source 112 may be connected to the processing system 108 via a pluggable network adapter.

While the data sources data source 112a-d may correspond to a TOR switch, one or more of the data sources 112a-d may be considered host devices, servers, network appliances, data storage devices, or combinations thereof. A data source 112, in some embodiments, may correspond to one or more of a Personal Computer (PC), a laptop, a tablet, a smartphone, a server, a collection of servers, or the like. It should be appreciated that a data source 112 may be referred to as a host, which may include a network host, an Ethernet host, an InfiniBand (TB) host, etc. As another specific but non-limiting example, one or more of the data sources 112 may correspond to a server offering information resources, services and/or applications to user devices, client devices, or other hosts in the environment 100. It should be appreciated that the data sources 112 may be assigned at least one network address (e.g., an IP address) and the format of the network address assigned thereto may depend upon the nature of the network to which the data source 112 is connected.

FIG. 2 illustrates that one or multiple networking cables may be used to connect a data source 112 to a processing system 208. In some embodiments, a data source 112 (e.g., the first data source 112a and third data source 112c) may connect to a single port 208 (e.g., the first port 208a and fourth port 208d) via a bidirectional communication link 216. The bidirectional communication link 216 may be established over a networking cable and may utilize any suitable communication protocol known or yet to be developed for the transmission of data packets.

A data source 112 (e.g., the second data source 112b and fourth data source 112d) may alternatively, or additionally, be connected with the processing system 108 via multiple ports 208 (e.g., the second port 208b, third port 208c, fifth port 208e, and sixth port 208f). In such a configuration, one of the ports 208 may be used to carry packets from the processing system 108 to the data source 112 whereas the other of the ports 208 may be used to carry packets between the data source 112 and the processing system 108. As an example, the second port 208b is shown to receive packets from the second data source 112b via a data uplink 220 whereas the third port 208c is shown to carry packets from the processing system 108 to the second data source 112b via a data downlink 224. In this configuration, separate networking cables may be used for the data uplink 220 and the data downlink 224.

The processing system 108 may correspond to an optical switch and/or electrical switch. In some embodiments, the processing system 108 may include switching hardware 228 that is configurable to selectively interconnect the plurality of ports 208a-f, thereby enabling communications between the plurality of ports 208a-f, which enables communications between the data sources 112a-d. In some embodiments, the switching hardware 228 may be configured to selectively enable the plurality of data sources 112a-d to communicate in pairs based on a particular configuration of the switching hardware 228. Specifically, the switching hardware 228 may include optical and/or electrical component(s) 240 that are switchable between different matching configurations. In some embodiments, the optical and/or electrical components 240 may be limited in the number of matching configurations it can accommodate, meaning that a port 208 may not necessarily be connected with/matched with every other port 208 at a particular instance in time.

In some embodiments, the processing system 108 may correspond to an optical circuit switch, which means that the optical and/or electrical components 240 may include a number of optical and/or opto-electronic components that switch optical signals from one channel to another. The optical and/or electrical components 240 may be configured to provide an optical switching fabric, in some embodiments. As an example, the optical and/or electrical component(s) 240 may be configured to operate by mechanically shifting or moving an optical fiber to drive one or more alternative fibers. Alternatively, or additionally, the optical and/or electrical component(s) 240 may include components that facilitate switching between different port matchings by imparting electro-optic effects, magneto-optic effects, or the like. For instance, micromirrors, piezoelectric beam steering mechanisms, liquid crystals, filters, and the like may be provided in the optical and/or electrical components 240 to facilitate switching between different matching configurations of optical channels.

In some embodiments, the processing system 108 may correspond to an electrical switch, which means that the optical and/or electrical components 240 may include a number of electrical components or traditional electronic circuitry that is configured to manage packet flows and packet transmissions. Accordingly, the optical and/or electrical components 240 may alternatively or additionally include one or more Integrated Circuit (IC) chips, microprocessors, circuit boards, DPUs, simple analog circuit components (e.g., resistors, capacitors, inductors, etc.), digital circuit components (e.g., transistors, logic gates, etc.), memory devices, Field Programmable Gate Arrays (FPGAs), Application Specific Integrated Circuits (ASICs), combinations thereof, and the like.

Embodiments of the present disclosure contemplate operating a processing system 104 using a switching engine 244 and one or more ML models 132 stored in memory 128. The ML model(s) 132 may be used by the processor 116 of the processing system to execute an AI system as described herein.

In some embodiments, the processing system 108 may comprise a processor 116 or a system on a chip (SoC) configured to perform application-specific integrated circuit (ASIC) forwarding). The processor 116 or SoC may execute a programmable AI engine and a parser as described herein.

The processing system 108 may comprise a separate parser and/or parsing logic for each port 208a-f. Parsing may be a function of the processor 116 of the processing system 108.

The processor 116 of the processing system 108 may be enabled to execute an AI programmable engine or inference engine as described herein.

In some embodiments, the processor 116 may be enabled to execute a separate AI programmable engine or inference engine for each port. For efficient flow of data, a designated AI programmable engine may be adjacent to each port's parsing logic or parser.

Figure 3:
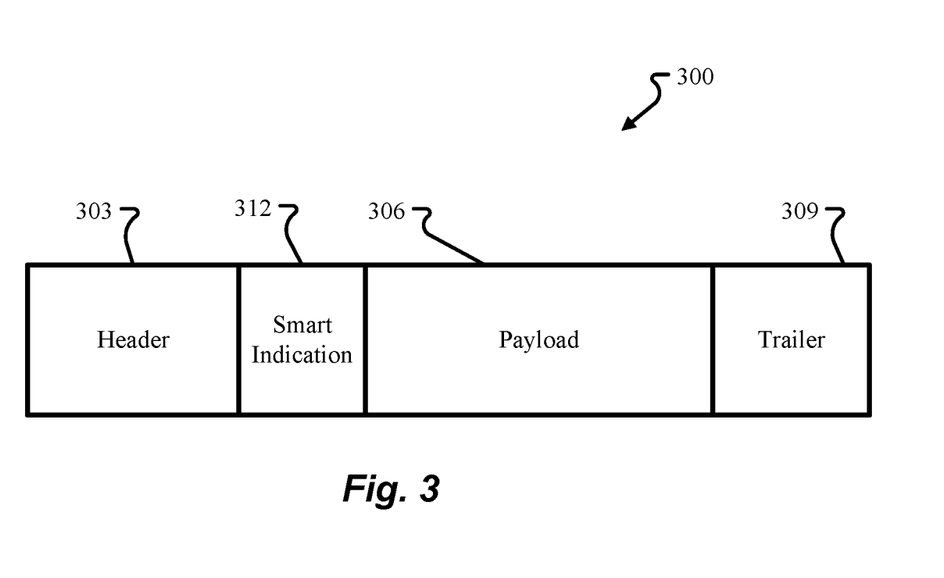
FIG. 3 is an illustration of a packet in accordance with one or more embodiments of the present disclosure.

A packet, when received by a processing system 108, may comprise a header, a payload, and a trailer. After processing a packet, the processing system 108 may in some embodiments output a processed packet 300 as illustrated in FIG. 3. A processed packet 300 may comprise the header 303 and payload 306 of the received packet and a smart indication 312 as described herein.

A header 303 of the packet 300 may comprise an initial block of data of the packet and may include information such as metadata, timestamp, context data, an email header, an HTTP header, or other information. The header 303 may follow a particular specification or format to allow for parsing. The header 303 may generally include enough information to ensure the payload 306 of the packet 300 is deliverable to a destination. As used herein, a header section may refer to data extracted from a packet header. A packet descriptor may include the packet header as well as other information related to the packet other than the payload of the packet.

A payload 306 of the packet 300 may comprise data of the packet 300 which is the actual intended message for the packet. While the header 303 and/or trailer 309 may comprise data or metadata with the purpose of ensuring the packet is deliverable, the payload 306 may be the data which is needed to arrive at the destination.

A trailer 309 of the packet 300 may comprise supplemental data or metadata marking the end of the packet 300. The trailer 309 may follow a particular specification or format to allow for the processing system 108 to identify an end of the packet 300. In some embodiments, a packet 300 may not include a trailer 309 or the trailer 309 may be the payload 306 or a part of the payload 306.

A smart indication 312 for a received packet as described herein may be data generated by a programmable AI system based on data in a header of the packet. A smart indication 312 may be any number of bits. For example, a smart indication 312 may be a single bit, operating as a flag, or a group of bits including a variety of information. A smart indication 312 may be added to a packet as a field of the header, may be added as part of a payload of the packet, or may otherwise be appended to the packet. While the smart indication 312 is illustrated as being in a middle of the packet 300, it should be appreciated the smart indication 312 may be at any point of a packet, such as a first group of bits, a last group of bits, or any bits throughout the packet.

A smart indication 312 as described herein may be used in the packet forwarding process for purposes of packet forwarding, classification, telemetry generation, and/or other purposes. Using such a smart indication 312 may enable a networking scheme to be more robust and secure at a smaller latency and bandwidth price than by processes requiring generating complex indications through multiple lookups.

A smart indication 312 may be used in addition to the raw packet header fields to allow for the enhancement of network traffic telemetry and to provide higher level indications to contribute to the mitigation of RCA procedures. The smart indication 312 and the header 303 may be used in combination to generate lookups and to achieve forwarding decisions.

The smart indication 312 as described herein provides benefits as compared to conventional methods of forwarding packets. For example, in order to achieve efficient treatment of a packet (e.g., forward the packet or to drop the packet if the packet is malicious), information which in higher abstraction level than the packet's raw fields may be needed. This kind of information may not be available in the packet header and in some cases, this logic may change depending on the task and even the data patterns themselves.

The systems and methods described herein provide advantages such as speed efficiency (smaller latency and higher bandwidth since multiple lookups are not required), table area efficiency (as only the area to store model weights is required, and configurability (as the systems and methods may be used for a number of problems).

Figure 4:
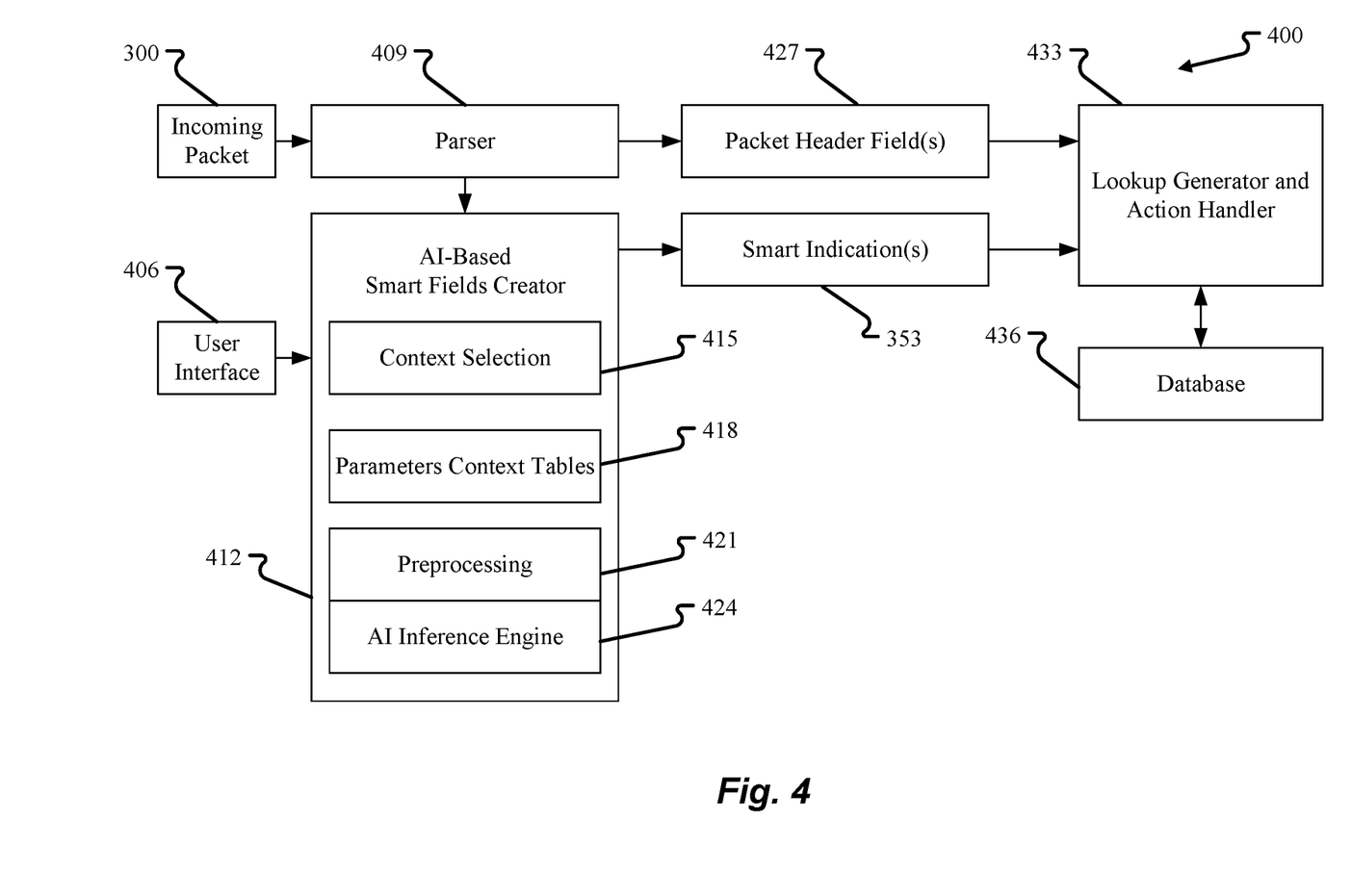
FIG. 4 is a block diagram of a system in accordance with one or more embodiments of the present disclosure.
Figure 5:
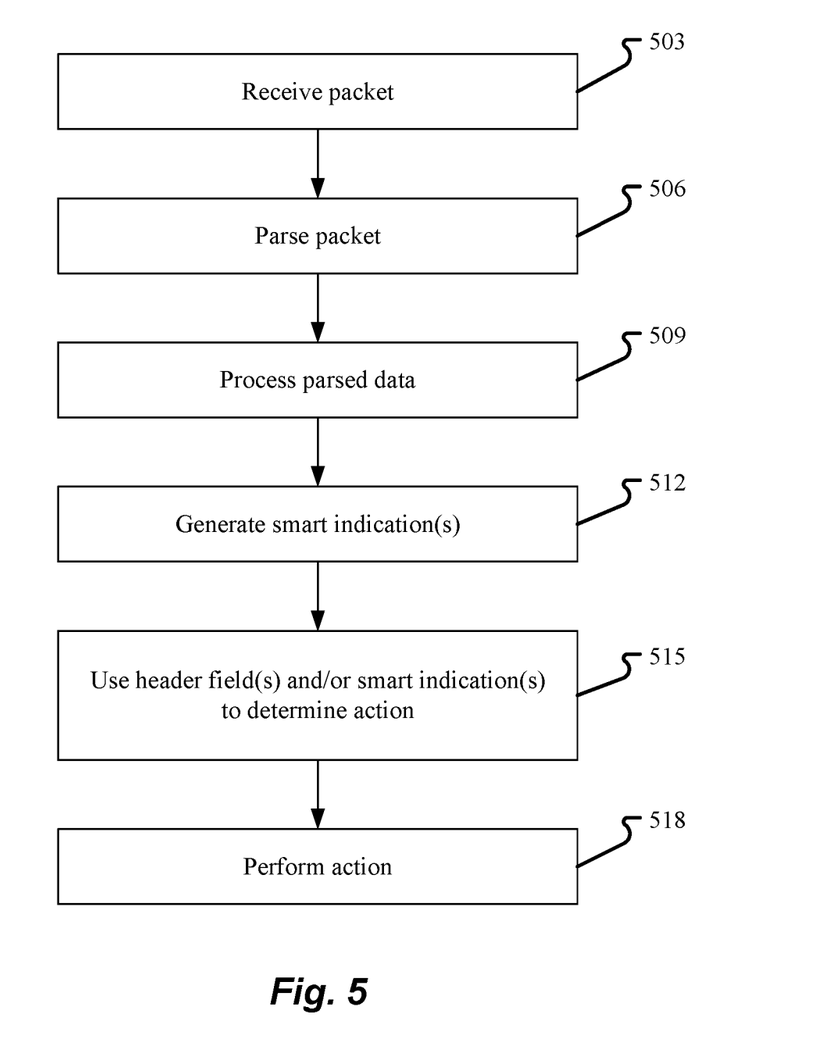
FIG. 5 is a flowchart of a method in accordance with one or more embodiments of the present disclosure.

In some embodiments, a programmable AI mechanism 400 as illustrated in FIG. 4 may be implemented using a processor 116 of a processing system 108. Implementing the AI mechanism 400 may comprise performing a method as illustrated by the flowchart of FIG. 5.

While described herein as being performed by a processor of a processing system 108, it should be appreciated the systems and methods described herein may be performed by a hardware device implemented in silicon or hardware—as opposed to software. Implementing the AI in silicon allows for the AI decision making features to be performed in the pipeline.

At 503, an incoming packet 300 may be received by a processing system 108. A packet 300 may be sent to the processing system 108 by a data source 112 via a network 104 as illustrated in FIG. 1. A packet 300 may comprise one or more header fields 303, a payload 306, and a trailer 309 as illustrated in FIG. 3.

At 506, upon being received by the processing system 108, the incoming packet 300 may be parsed using a parser 409 to identify any header fields 306 of the packet 300. In some embodiments, the parser 409 may receive only a packet header of the packet. The parser may next extract all header fields to be used by various processing engines including pipeline lookups, processing approach, and AI blocks as described herein. The processing system 108 may comprise one or more ingress pipelines. Each ingress pipeline may include a parser. The parser may be capable of receiving a packet as a formatted collection of bits in a particular order as illustrated in FIG. 3, and to parse the packet into header fields. In some embodiments, the parser may start from a beginning of the received packet and identify header fields for processing. In some embodiments, the parser may strip the header(s) from the payload of the packet and send the payload or the entire packet directly to a deparser.

The parser 409 may be configured to forward any identified fields 427 of the header 306 to a lookup generator and action handler 433 as well as to an AI-based smart fields creator 412.

In some embodiments, the parser 409 may also send one or more fields of a payload of the packet 300 to the AI-based smart fields creator 412. At 509, the AI-based smart fields creator 412 may be configured to perform preprocessing on the header 303.

Preprocessing the header 303 may comprise modifying data comprised by the header 303 to generate data capable of being used as an input to the AI engine. Preprocessing the header data may comprise mapping data from the received packet to one or more specific types of groups or flows. Preprocessing the header data may comprise filtering the data to prepare the data packet for being processed by the ML model of the AI-based smart fields creator 412.

Preprocessing the header data may comprise normalizing and/or scaling the data. For example, in the case of a neural network, the header data may be normalized and/or scaled to a limited range to be processed by the neural network.

Preprocessing the header data may comprise performing feature selection. A packet header may comprise a plurality of fields. One or more of the fields may be common to many or all packets and thus may not be useful for AI analysis. Using feature selection, the AI-based smart fields creator may be enabled to determine which fields of a packet's header may be useful for AI inference. Such fields may be determined to contain features of which AI inference may be useful.

Because a packet header may contain a lot of information, processing every single piece of information in a packet header may be very time consuming. Using feature selection, only particular fields of a header may be considered to create a smart indication for greater efficiency.

In some embodiments, the preprocessing of the header data may be directly or indirectly controlled by a user via a user interface 406. For example, a user may be enabled ton control which set of fields of incoming packets may be analyzed using the AI-based smart fields creator 412.

The preprocessing may be performed using a preprocessing system 421 of the AI-based smart fields creator 412. The preprocessing may utilize and/or take as input data from one or more of a context selection system 415 and one or more parameters context tables 418.

At 512, the pre-processed header 306 may be input into the AI inference engine 424 of the AI-based smart fields creator 412. At 515, the AI inference engine 424 may be configured to process the header 306 with an AI engine trained to output a smart indication 312 relating to the received packet 300.

The AI inference engine 424 may be trained to generate an output based upon an input. The input may be, for example, one or more header fields of a received packet. The output may be one or more packet classifications or other data which may be useful for packet identification, packet classification, action handlining, lookup generation, packet flow analysis, or other uses. The output of the AI inference engine 424 may be described as a smart indication 312.

The AI inference engine 424 may comprise one or more of a decision tree, a neural network, and/or other forms of AI. The AI inference engine 424 may be specific to the packet and/or to the flow with which the packet is associated.

The AI inference engine 424 may be one or more silicon chips designed to perform parallel operations as required by AI. In some embodiments, the AI inference engine 424 may comprise an accelerator for parallel processing, such as one or more ASICs, CPUs, GPUs, FPGAs, or some combination thereof.

In some embodiments, the AI inference engine 424 may be a trained AI engine and may be implemented in silicon. By putting the AI inference engine 424 in the silicon, the AI inference engine 424 may be directly in the pipeline.

While the AI inference engine 424 may be implemented in silicon, the AI inference engine 424 may be programmable. An infrastructure may be built such that one or more models may be implemented with programmability. For example, a neural network in silicon which uses adjustable/programmable weights and parameters may be implemented. in this way, while the number of layers of the neural network may not be adjustable, the weights may be adjustable.

In some embodiments, the AI inference engine 424 may be programable in the mean of the selection fields used for the model and/or the weights and/or model parameters used for the AI inference engine 424 may be configurable.

A system as described herein offers programmability via configuration registers space. In some embodiments, a number of layers of the AI engine is configurable by a user. For example, the number of layers may be adjusted, the weights of the model may be adjusted, and/or hyperparameters may be adjusted. In some embodiments, the AI inference engine 424 may comprise a decision tree, and the depth, children of nodes, etc., for the decision tree may be adjusted. In a neural network, width of each layer, number of layers, etc., may be adjusted. Any such adjustable parameters may be adjusted by a user via a user interface 406.

The AI inference engine 424 may enable a degree of freedom such that, while being expressed in hardware, the AI inference engine 424 may adapt as needed. In some embodiments, certain elements of the AI inference engine 424 may be adjustable. For example, in the case of a neural network, a number of active layers may be adjusted as needed, either manually or automatically.

The AI inference engine 424 may be configured to output a smart indication 312. A smart indication 312 may comprise one or more of a prediction, e.g., a flow size for a flow to which the received packet belongs. A flow size may refer to, for example, a size of the flow, e.g., in bytes, or bandwidth. A smart indication 312 may contain more information and/or other labels. In some embodiments, a smart indication 312 may comprise a type of prediction or estimation output by the AI engine 424.

A smart indication 312 may be any type of estimation. For example, a smart indication may be a predication of a flow size of a flow to which the received packet is related. Other labels may be generated.

A smart indication 312 may comprise high level information such as smart insights about the received packet. Any type of information which may be useful to a lookup generator 433 to manage the packet such as for forwarding, determining quality of service, telemetry specifications, etc.

In general, a smart indication may be metadata for a packet which may be used to classify the packet. A smart indication 312 may be similar to the type of data from lookups but without requiring lookups.

In addition to the raw header fields, information from the payload may be used by the AI inference engine 424 to generate a smart indication 312.

Other information, such as context of the packet may be used to generate a smart indication 312. For example, the AI-based smart fields creator 412 may obtain context information via a parameter's context table 418. A context selection system 415 may be used to determine a flow relating to the packet 300.

Context may be related to, for example, an identifier of a flow to which the packet belongs, lengths of previously received packets belonging to the same flow as the received packet 300, a timestamp of the most recently received packet (which may be used to calculate a time delta between the last two packets). Any such data may be used by the AI inference engine 424 to generate the smart indication(s).

In this way, a parsed header from a packet stream into a processor running an AI and/or AI engine and is transformed into one or more smart indications which may be used in a variety of ways as described herein.

Once generated, the generated smart indication(s) 312 for a received packet 300 may be sent by the AI-based smart fields creator 412 to the lookup generator and action handler 433. In some embodiments, the smart indication 312 may be added to the received packet 300 to create a modified packet 300 as illustrated in FIG. 3.

At 515, the method may comprise using, with a forwarding engine, the generated smart indications to determine an action. For example, a smart indication may be used to achieve various packet forwarding decisions, packet classification, telemetry generation, to generate one or more lookups, etc.

In some embodiments, the forwarding engine may use the smart indication along with one or more other fields from the packet, such as packet header fields 427 output from the parser 409.

In some embodiments, the lookup generator and action handler may be configured to perform a lookup using one or more of the packet header fields 427 and/or smart indications 312 using a database 436 such as a data repository 140 and/or a data source 112 via a connection to a network 104 as illustrated in FIG. 1.

In some embodiments, smart indications 312 may be discarded after use. For example, a smart indication for a first packet may be removed from memory after the first packet is forwarded or after an action to be performed based on the first packet is determined. In some embodiments, a smart indication for a first packet may be used for subsequent packets in the same flow as the first packet.

Conventionally, packet processing is accomplished by performing a plurality of lookups in tables to determine an action to perform based on the packet. These lookups create data which may be used to perform an action based on the packet. Using the systems and methods described herein, utilizing an AI inference engine 424, data can be generated without requiring any lookups.

At 518, an action may be performed based on the smart indication 312. For example, the received packet or a modified packet 300 including the smart indication 312 may be forwarded based at least in part on the smart indication 312. Forwarding the packet may comprise forwarding the packet to a network location such as to an address based on both the smart indication and data comprised by header information of the packet.

In some embodiments, the action may comprise discarding the packet based on the smart indication. For example, the smart indication may indicate the packet is malicious and should not be forwarded.

In some embodiments, the action may comprise associating the packet 300 with a classification based on the smart indication 312, generating telemetry data based on the smart indication 312, generating a lookup, and/or performing a forwarding decision based on the smart indication 312.

In this way, a forwarding decision may be generated based on one or more lookups performed by a lookup generator action handler 433 and based on one or more smart indications 312 generated by the AI inference engine 424 of the AI-based smart fields creator 412 based on a received packet 300.

The systems and methods described herein enable a wide range of use cases which improve upon conventional methods. Conventional methods of classifying a packet only using lookups is not always possible and when it is possible, it is not efficient.

For example, conventional methods of packet classification require 10 or more accesses to memory, while using a system as described herein, a packet may be classified using only one or two lookups.

While using AI may incur costs relating to accuracy, great advances in efficiency are gained. For uses such as packet scheduling, some error is not critical while better efficiency is extremely beneficial. For uses such as load balancing, AI as described herein may be utilized to select a port.

Because the AI inference engine 424 is in the pipeline, the pipeline may be enhanced and may not be entirely replaced with AI. Each part of the pipeline may be benefitted by the AI inference engine 424. In this way, the pipeline can be enhanced and may provide a better experience. For example, an AI inference engine 424 as described herein may provide sophisticated prediction on received packets such as flow size or flow toggling rate or burstiness rate. Such high-level information may be used in telemetry systems creating a benefit. An AI system as described herein performs these functions with better resource utilization as compared to conventional systems.

As described herein, a computing system may be enabled to receive a packet, to analyze particular fields of the packet, to generate one or more smart indications based on the packet, and to handle the packet based on the smart indications in a more efficient manner than conventionally possible. Such a computing system may comprise a hardware AI-based inference engine in a pipeline.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured according to the following:

(1) A switch comprising a programmable configurable AI engine, the switch to:
  receive a packet;
  process, using the configurable AI engine, data associated with the packet to generate an indication associated with the packet; and
  forward the packet based, at least in part, on the indication.

(2) The switch of (1), wherein the packet is received from a first network location, and the packet is forwarded to a second network location.

(3) The switch of (1) and/or (2), wherein the data associated with the packet comprises at least one of header data and metadata.

(4) The switch of any of (1)-(3), wherein the data processed using the configurable AI engine is a set of fields contained in the packet.

(5) The switch of any of (1)-(4), wherein the set of fields is associated with a set of fields selected by a user.

(6) The switch of any of (1)-(5), wherein the switch processes header data comprised by the packet using one or more of data scaling and normalization to generate the data associated with the packet.

(7) The switch of any of (1)-(6), wherein the data associated with the packet comprises parsed data from a header of the packet generated by a parser.

(8) The switch of any of (1)-(7), wherein the AI engine is a neural network implemented in silicon.

(9) The switch of any of (1)-(8), wherein the AI engine comprises one or more of a neural network and a decision tree.

(10) The switch of any of (1)-(9), wherein the AI engine generates the indication based on one or more of a user-programmed comparison and one or more user-selected comparison targets.

(11) The switch of any of (1)-(10), wherein one or more of a number of layers of the AI engine and or one or more weights associated with the AI engine is configurable by a user.

(12) The switch of any of (1)-(11), wherein a maximum number of layers of the AI engine is controlled by hardware.

(13) The switch of any of (1)-(12), wherein forwarding the packet comprises:
determining the packet is malicious based on the indication; and
discarding the packet.

(14) The switch of any of (1)-(13), wherein the packet is forwarded to an address based on both the indication and data comprised in header information of the packet.

(15) The switch of any of (1)-(14), further comprising incorporating the indication into the packet prior to forwarding the packet.

(16) The switch of any of (1)-(15), further comprising associating the packet with a classification based on the indication.

(17) The switch of any of (1)-(16), further comprising generating telemetry data based on the indication.

(18) The switch of any of (1)-(17), wherein forwarding the packet based on the indication comprises generating a lookup and performing a forwarding decision based on the indication.

(19) A network device to:
receive a packet;
perform, with a lookup generator action handler, one or more lookups based on one or more packet header fields of the packet;
process, with an AI engine, packet header data of the packet;
generate, with the AI engine, an indication; and
generate a forwarding decision for the packet based on the one or more lookups performed by the lookup generator action handler and the indication generated with the AI engine.

(20) A system-on-a-chip to perform packet forwarding, the system-on-a-chip further to:
receive a packet;
perform, with a lookup generator action handler, one or more lookups based on one or more packet header fields of the packet;
process, with an AI engine, packet header data of the packet;
generate, with the AI engine, an indication; and
generate a forwarding decision for the packet based on the one or more lookups performed by the lookup generator action handler and the indication generated with the AI engine.

What is claimed is:

1. A switch comprising a programmable configurable artificial intelligence engine, the switch to:
receive a packet;
process, using the configurable artificial intelligence engine, data associated with the packet to generate an indication associated with the packet, wherein the configurable artificial intelligence engine comprises one or more of a decision tree with an adjustable depth and a neural network with an adjustable number of layers of an adjustable width, wherein the indication comprises one or more bits, and wherein one or more of the depth of the decision tree, the number of layers of the neural network, and the width of the layers of the neural network are adjustable via a user interface; and
forward the packet based, at least in part, on the indication.

2. The switch of claim 1, wherein the packet is received from a first network location, and the packet is forwarded to a second network location.

3. The switch of claim 1, wherein the data associated with the packet comprises at least one of header data and metadata.

4. The switch of claim 1, wherein the data processed using the configurable artificial intelligence engine is a set of fields contained in the packet.

5. The switch of claim 4, wherein the set of fields is associated with a set of fields selected by a user.

6. The switch of claim 1, wherein the switch processes header data comprised by the packet using one or more of data scaling and normalization to generate the data associated with the packet.

7. The switch of claim 1, wherein the data associated with the packet comprises parsed data from a header of the packet generated by a parser.

8. The switch of claim 1, wherein the neural network is implemented in silicon.

9. The switch of claim 1, wherein the artificial intelligence engine generates the indication based on one or more of a user-programmed comparison and one or more user-selected comparison targets.

10. The switch of claim 1, wherein one or more layers of the neural network are configurable by a user.

11. The switch of claim 1, wherein a maximum number of layers of the neural network is controlled by hardware.

12. The switch of claim 1, wherein forwarding the packet comprises:
determining the packet is malicious based on the indication; and
discarding the packet.

13. The switch of claim 1, wherein the packet is forwarded to an address based on both the indication and data comprised in header information of the packet.

14. The switch of claim 1, further comprising appending the indication to the packet prior to forwarding the packet.

15. The switch of claim 1, further comprising associating the packet with a classification based on the indication.

16. The switch of claim 1, further comprising generating telemetry data based on the indication.

17. The switch of claim 1, wherein forwarding the packet based on the indication comprises processing the indication and at least a portion of a header of the packet to generate a lookup and performing a forwarding decision based on the indication.

18. A network device to:
receive a packet;
perform, with a lookup generator action handler, one or more lookups based on one or more packet header fields of the packet;
process, with an artificial intelligence engine, packet header data of the packet;
generate, with the artificial intelligence engine, an indication, wherein the artificial intelligence engine comprises one or more of a decision tree with an adjustable depth and a neural network with an adjustable number of layers of an adjustable width, wherein the indication comprises one or more bits, and wherein one or more of the depth of the decision tree, the number of layers of the neural network, and the width of the layers of the neural network are adjustable via a user interface; and
generate a forwarding decision for the packet based on the one or more lookups performed by the lookup generator action handler and the indication generated with the artificial intelligence engine.

19. A system-on-a-chip to perform packet forwarding, the system-on-a-chip further to:
receive a packet;
perform, with a lookup generator action handler, one or more lookups based on one or more packet header fields of the packet;
process, with an artificial intelligence engine, packet header data of the packet, wherein the artificial intelligence engine comprises one or more of a decision tree with an adjustable depth and a neural network with an adjustable number of layers of an adjustable width, and wherein one or more of the depth of the decision tree, the number of layers of the neural network, and the width of the layers of the neural network are adjustable via a user interface;
generate, with the artificial intelligence engine, an indication, wherein the indication comprises one or more bits; and
generate a forwarding decision for the packet based on the one or more lookups performed by the lookup generator action handler and the indication generated with the artificial intelligence engine.

20. The system-on-a-chip of claim 19, wherein the packet is received from a first network location, and the packet is forwarded to a second network location.

* * * * *